April 2, 1935.                C. C. PRESCOTT                1,996,589
                                APPARATUS
                             Filed Dec. 26, 1933
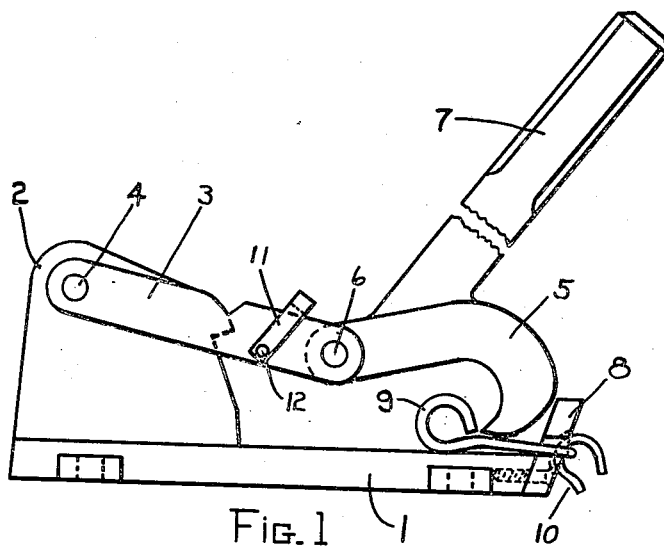
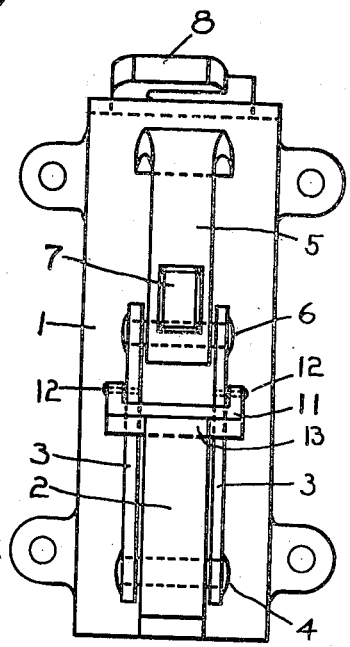
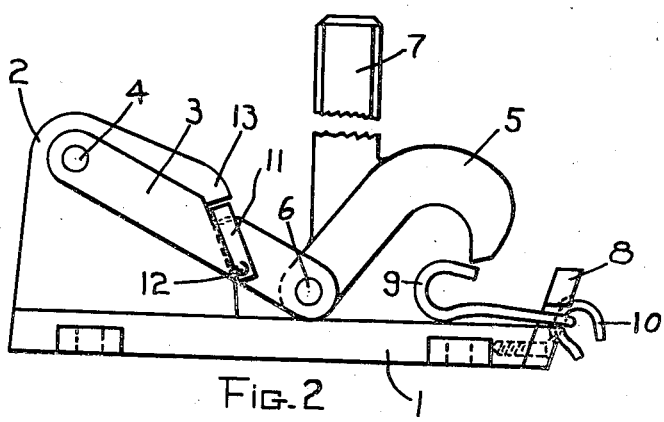
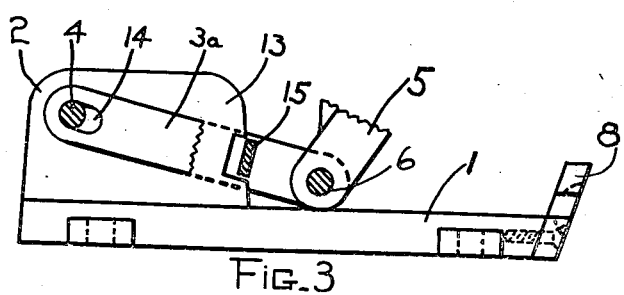
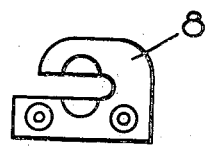
INVENTOR
CARLTON C. PRESCOTT
BY
Roy A. Plant.
ATTORNEY Patented Apr. 2, 1935

1,996,589

UNITED STATES PATENT OFFICE 1,996,589

APPARATUS

Carlton C. Prescott, Menlo Park, N. J.

Application December 26, 1933, Serial No. 703,933

17 Claims. (Cl. 81—15)

My present invention relates to tools that may be used for various purposes and in particular to tools especially adapted for use in removing or attaching the transverse chains of tire chains.

Many tools for the general purpose of use in repairing tire chains have heretofore been produced, but they have all, so far as I am aware, been provided with overlapping jaws or wedge-like parts that are forced sidewise under the bills of the cross chain end-hook to pry same open. Such tire chain tools which, generally speaking, are of the plier type, tend to stick at the end of the wedging operation which opens the end-hook of the cross chain, necessitating not infrequently the use of a hammer to loosen the tool from the chain after the opening has been completed. A further difficulty is that such tool tends to get tangled up with the side chains of the tire chain while an attempt is being made to release the chain from the tool.

In my copending patent application Serial Number 602,732 (patented January 19, 1934, No. 1,942,447) I have described and claimed one type of tool which obviates the previously mentioned difficulties heretofore encountered. A specific form of such tool involves the use of an endwise slidable bar on one end of which is placed a hook-type dog that is useable to pull the end-hook of a transverse chain open, when force is applied to direct the bar and hook in an endwise pulling direction. The same tool being adapted to close the end-hooks of transverse chains by means of force directed downwardly on the hook-like dog when placed over a hook to be closed.

My present invention involves a still different type of tool which not only obviates the difficulties encountered in using the previous type tools with overlapping jaws and wedge-like parts but also simplifies and improves the tool described in my aforementioned co-pending patent application.

Accordingly, among the objects of the present invention is the provision of a novel tool which may be used for opening and closing of various articles, such as the end-hooks of tire chain cross chains. A further object of the invention is to provide a tool of the class described which is very compact, may be carried in the tool compartment of a motor vehicle without occupying an excessive amount of space, may be mounted on a bench, is of simplified construction, efficient in use, and economical to manufacture. Other objects and advantages will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but two of various ways in which the principle of the invention may be used.

In said annexed drawing:—

Fig. 1 is a side view of my improved tool in position for opening a cross chain end-hook; Fig. 2 is a side view of the same tool in position for closing a cross chain end-hook; Fig. 3 is a partial side view of a modification involving an alternative locking mechanism; Fig. 4 is a plan view of the tool with the operating lever in vertical position as shown in Fig. 2; and Fig. 5 is a front view of the chain holding plate which attaches to the base of the tool as shown in the other figures.

In the drawing I have shown the preferred embodiment of my invention in diagrammatic manner and in connection with the opening and closing of an end-hook of a tire chain cross chain. For simplicity of showing and understanding the invention, I have merely shown in Figs. 1 and 2 an end-hook of a tire chain cross chain being opened and closed, since obviously the cross chain as well as the side chains could be connected thereto without changing the principle of the invention.

Referring more particularly to the drawing, the base 1 of the tool, which may be made of cast iron, steel, or other structural metal, or material, is provided with a raised portion or pivot mounting member 2 at one end thereof. Said raised portion may be made integral with the base, fastened thereon by conventional means, or it may be any other means so as to form a pivot mounting for link 3. A link member 3 is pivoted at one end on said raised member 2 by means of a pin or rivet 4. At the opposite end of said link member 3 is pivotably mounted a dog or hook-like member 5 by means of a pin or rivet 6. Dog 5 is operated by any suitable means such as a handle 7 which may be, if desired, mounted directly on the dog by means of welding, brazing, forging, riveting, or other equivalent means. At the opposite end of the base 1 from raised member 2, is provided a holding member 8 which may be in any convenient form for holding the cross chain end-hook during the opening or closing operation. I prefer, however, to use one of the type shown in Fig. 5 since this holds the tire chain firmly in position throughout the operations to be performed.

To close the bills of end-hook 9 of a cross chain 10 as shown in Fig. 2, it is necessary to provide some means for holding link member 3 firmly in lowered position, so that downward pressure can be exerted on dog 5. The locking of link member 3 may be accomplished in any convenient manner, for instance, by providing such link member with a locking member 11 pivoted at 12 on link member 3 and adapted to engage with a shoulder 13 on raised member 2, or equivalent device. During the closing operation locking member 11 is engaged with shoulder 13 of raised member 2 as shown in Fig. 2. When opening the end-hook of a cross chain, however, locking member 11 is thrown back out of engagement as shown in Fig. 1.

The locking of pivoted link member 3 on which dog 5 is mounted may be accomplished in other ways. For instance, as shown in Fig. 3, link member 3a may be slotted at 14 so that pin or rivet 4 will pass down the slot as member 3a is moved endwise. A locking member 15 being mounted on said link member 3a and adapted to engage with shoulder 13 when link member 3a is moved to the left with tool in the position shown in Fig. 3.

The operation of my improved tool is as follows: To open end-hook 9 of cross chain 10, I place the cross chain as shown in Fig. 1 with the hook passing through holding member 8 and with the bills of hook 9 up. With holding member 11 out of engagement, dog 5 is placed behind the bills of end-hook 9 which are to be pulled away from the body thereof. With dog 5 thus in place the apparatus is ready for the opening of hook 9. This is accomplished by forcing lever 7 to the right and downward, which forces the point of dog 5 under the bills of hook 9 in direction toward raised portion 2 of base 1 so that as force is exerted on lever 7 the bills of hook 9 are pulled upward and away from the body thereof, for instance, to the extent shown in Fig. 2. Dog 5 may then be released by moving lever 7 to the left following which the cross chain 10 and hook 9 may be removed from the tool.

The replacement of a cross chain and the closing of the bills of an end-hook thereof is accomplished by placing same as shown in Fig. 2 with locking member 11 in engagement with shoulder 13 in which position dog 5 will rest on the open bills of hook 9 as shown. With the chain and tool in this position it is only necessary to move lever 7 to the right and down and this will force dog 5 in a downward direction, and push the extended bills of hook 9 downward into closed position. The pressure may then be released and lever 7 moved to the left, following which the chain can be removed from the tool and the hook-end at the other end of the cross chain closed in like manner.

For convenience, I prefer to make link member 3 approximately the same length, or slightly longer than dog 5. Pin or rivet 4 on which link member 3 is pivoted may be placed a distance above the base equal to approximately one third to one half the total length of link member 3 and dog 5. These lengths and distances, however, are not fixed since it is obvious that in the carrying out of the principle of the invention, for instance, with apparatus in the form of a tire chain repair tool, it is only necessary to proportion the parts so that when the link member is locked in place, the dog will rest on the bills of cross chain end-hook 9 as shown in Fig. 2; and when the tool is in opening position, the dog will hook back of the bills of the end-hook 9 as shown in Fig. 1.

While I have described my present invention in terms of being a tire chain repair tool, I wish it to be understood that it is not limited to that specific form, since obviously it is adapted for use in connection with the opening or spreading of various kinds of hooks and pieces of equipment, and moreover, it may be used, in the closing or compressing of various things such as driving and clinching rivets, joining the ends of a belt with metal lacing, etc.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:—

1. A device of the class described, comprising a base having mounted thereon a pivoted link, means for locking said link, a hook-like dog pivotably mounted on the free end of such link, and means for operating said dog.

2. A device of the class described, comprising a base having a raised portion at one end, a link member pivoted on said raised portion, means for locking said link member, a dog pivoted on the free end of said link member, and means for moving said dog toward said base.

3. A device of the class described, comprising an elongated base having a raised portion at one end, a link member pivoted on said raised portion and extending over the non-raised portion of said base, a hook-like dog with hook facing said base and pivoted on the free end of said link member and extending toward the remote end of the non-raised portion of said base, and means for moving said dog along said base from the remote end thereof toward said raised portion.

4. A device of the class described, comprising an elongated base having a raised portion at one end, a link member pivoted on said raised portion and extending over the non-raised portion of said base, a hook-like dog with hook facing said base and pivoted on the free end of said link member and extending toward the remote end of the non-raised portion of said base, and means for moving said dog toward said base as well as along same from the remote end thereof toward said raised portion.

5. A device of the class described, comprising a base having a raised portion at one end, a pivoted link member movable endwise to lock, means to lock said pivoted link member, a dog pivoted on the free end of said link member, and means for moving said dog toward said base.

6. A device of the class described, comprising a base having a raised portion at one end, a pivoted link member movable endwise to lock, means to lock said pivoted link member, a dog pivoted on the free end of said link member, and means for moving said dog along said base.

7. In a tire chain tool, the combination of a base having a raised portion at one end, a link member pivoted on said raised portion, means for locking said link member, a dog pivoted on the free end of said link member, and lever means mounted on said dog for moving same toward said base.

8. In a tire chain tool, the combination of a base having a raised portion at one end, a link member pivoted on said raised portion, means for locking said link member, a dog pivoted on the free end of said link member, and means for moving said dog along said base.

9. In a tire chain tool, the combination of a base having a raised portion at one end, a link member pivoted on said raised portion, means for locking said link member, a dog pivoted on the free end of said link member, and means for moving said dog toward and along said base.

10. In a tire chain tool, the combination of a base having a raised portion at one end, a link member pivoted on said raised portion, a pivoted means for locking said link member, a dog pivoted on the free end of said link member, and means for moving said dog toward and along said base.

11. In a tire chain tool, the combination of a base having a raised portion at one end, a link member pivoted on said raised portion, means for locking said link member, a dog pivoted on the free end of said link member, means for moving said dog toward and along said base, and means for holding the end-hook of a tire chain cross chain.

12. In a tire chain tool, the combination of a base having a raised portion at one end, a link member pivoted on said raised portion, means for locking said link member, a dog pivoted on the free end of said link member, means for moving said dog toward and along said base, and a slotted means on the other end of said base for holding the end-hook of a tire chain cross chain.

13. In a tire chain tool, the combination of a base having a raised portion at one end, a pivoted link member movable endwise to lock, means to lock said pivoted link member, a dog pivoted on the free end of said link member, and means for moving said dog toward and along said base.

14. In a tire chain tool, the combination of a base having a raised portion at one end, a pivoted link member movable endwise to lock, means to lock said pivoted link member, a hook-like dog facing said base and pivoted on the free end of said link member, means for moving said dog toward and along said base, and means on the other end of said base for holding the end-hook of a tire chain cross chain.

15. In a tire chain tool, the combination of a base having a raised portion at one end, a link member pivoted on said raised member, means for locking said link member in lowered position, a hook-like dog facing said base and pivoted on the free end of said link member, the pivot point on said raised member for said link member being a distance above the base approximately equal to one third the combined length of link member and hook, means for moving said dog toward and along said base, and means for holding the end-hook of a tire chain cross chain in cooperative relation to said dog.

16. In a tire chain tool, the combination of a base having a raised portion at one end, a link member pivoted on said raised member, means for locking said link member in lowered position, a hook-like dog facing said base and pivoted on the free end of said link member, the pivot point on said raised member for said link member being a distance above the base approximately equal to from one third to one half the combined length of link member and hook, the length of said hook member varying from approximately two thirds to approximately full length of said link member, lever means for operating said dog, and a slotted means on the other end of said base for holding the end-hook of a tire chain cross chain in cooperative relation to said dog.

17. In a tire chain tool, the combination of a base having a raised portion at one end, a link member pivoted on said raised member, means for locking said link member in lowered position, a hook-like dog facing said base and pivoted on the free end of said link member, the pivot point on said raised member for said link member being a distance above the base approximately equal to one third the combined length of link member and hook, lever means for operating said dog, and a slotted means on the other end of said base for holding the end-hook of a tire chain cross chain in cooperative relation to said dog.

CARLTON C. PRESCOTT.